(12) United States Patent
Chliwnyj et al.

(10) Patent No.: US 6,831,801 B2
(45) Date of Patent: Dec. 14, 2004

(54) ECCENTRICITY COMPENSATION IN A WEB HANDLING SYSTEM

(75) Inventors: Alex Chliwnyj, Tucson, AZ (US); David Michael Davis, Tucson, AZ (US); David Lee Swanson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 379 days.

(21) Appl. No.: 10/075,260

(22) Filed: Feb. 15, 2002

(65) Prior Publication Data

US 2003/0156344 A1 Aug. 21, 2003

(51) Int. Cl.[7] ............................................. G11B 15/43
(52) U.S. Cl. ...................................... 360/71; 242/334.4
(58) Field of Search ..................... 360/71, 69, 73.04, 360/73.05, 73.08, 73.09, 73.11, 73.14; 242/334.2, 334.3, 334.4, 334.6; 318/6, 7

(56) References Cited

U.S. PATENT DOCUMENTS

| | | | |
|---|---|---|---|
| 4,015,799 A | 4/1977 | Koski et al. | 242/334.4 |
| 4,125,881 A | 11/1978 | Eige et al. | 242/334.3 |
| 4,126,817 A | 11/1978 | Luzio | 318/7 |
| 4,400,745 A | 8/1983 | Shu | 360/71 |
| 4,531,166 A | 7/1985 | Anderson | 360/73.04 |
| 4,739,948 A * | 4/1988 | Rodal et al. | 318/6 |
| 4,743,811 A | 5/1988 | Katayama | 242/334.4 |
| 4,878,165 A * | 10/1989 | Gotou et al. | 318/7 |
| 5,491,594 A * | 2/1996 | Yamamoto et al. | 360/71 |
| 5,540,398 A * | 7/1996 | Nishida et al. | 360/71 |
| 5,576,905 A | 11/1996 | Garcia et al. | 360/73.14 |
| 5,720,442 A * | 2/1998 | Yanagihara et al. | 242/334.2 |
| 5,725,168 A * | 3/1998 | Yokoyama et al. | 360/71 |
| 5,909,335 A | 6/1999 | Hardeng et al. | 360/73.04 |
| 6,364,234 B1 * | 4/2002 | Langiano et al. | 242/334.3 |

FOREIGN PATENT DOCUMENTS

| | | | |
|---|---|---|---|
| JP | 404168644 A * | 6/1992 | |
| JP | 405169122 A * | 7/1993 | |

* cited by examiner

*Primary Examiner*—David Hudspeth
*Assistant Examiner*—James L Habernehl
(74) *Attorney, Agent, or Firm*—John H. Holcombe

(57) ABSTRACT

A control system compensates for web tension variation caused by a first spool, (A) determines rotational frequency of the first spool; (B) determines variation in rotational velocity at the second spool which occurs at the (A) first spool frequency; (C) determines the rotational position at the first spool corresponding to the (B) variation in rotational velocity at the second spool; (D) calculates a drive motor profile for the first spool which tends to cancel the (B) variation in rotational velocity at the second spool; and (E) superimposes the (D) drive motor profile on a first spool drive motor at the (C) determined rotational position of the first spool.

36 Claims, 3 Drawing Sheets

FIG. 3
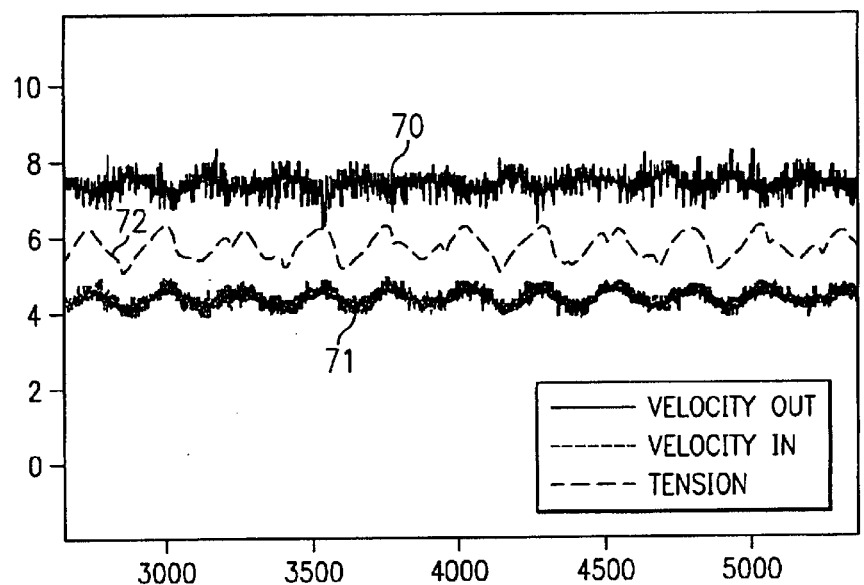
FIG. 4  MAGNITUDE OF MOTOR VELOCITIES AND TENSION AS FUNCTION OF ROTATIONAL FREQUENCY
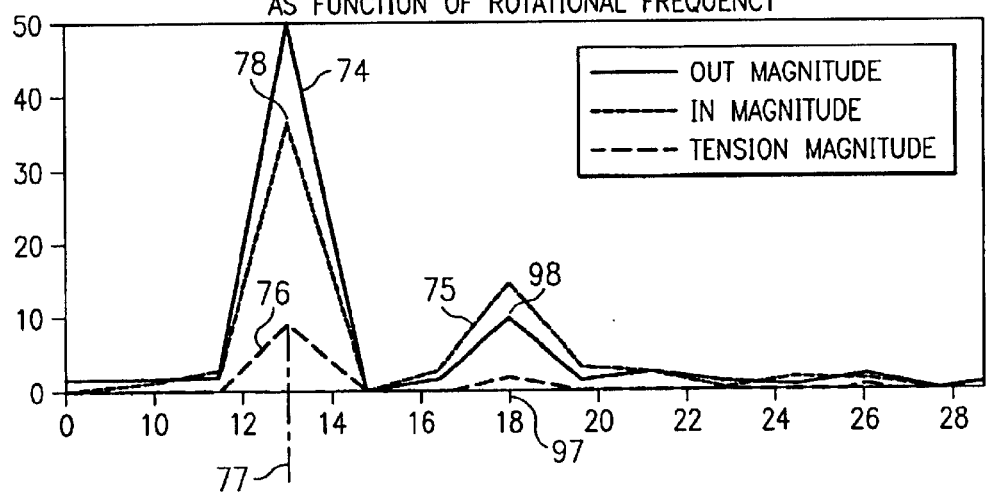

ECCENTRICITY COMPENSATION IN A WEB HANDLING SYSTEM

FIELD OF THE INVENTION

This invention relates to web handling systems, one example of which comprises magnetic tape drives, and, more particularly, to web handling systems in which the web is maintained under tension during high speed motion.

BACKGROUND OF THE INVENTION

Web handling systems, such as magnetic tape drives, respectively wind and unwind a web with respect to supply and take-up spools to transport the web along a web travel path between the spools. The web is transported under tension so as to avoid any slack and to avoid the possibility of jumping out of the web travel path. In the field of magnetic tape drives, the web travel path is termed the "tape path", and tension is required to insure that the magnetic tape remains in close proximity to a read/write tape head positioned in the tape path as the magnetic tape is transported across the tape head, allowing the tape head to read and/or write data with respect to the magnetic tape.

High speed magnetic tape drives have buffered or decoupled the magnetic tape along the tape path, for example, with a vacuum column buffer, which when small in size may be termed a "pucker pocket", in order to compensate for variations in tension as the spools are rotated. In a long tape path having a fluid pressure bearing or bearings, the fluid bearings may absorb and buffer small variations in tension. Other magnetic tape drives and other web handling systems may employ mechanical tension buffers such as spring-loaded idler wheels to absorb and buffer variations in tension.

Variations in tension come from any or all of several sources. Major variations in tension may come from variations in speeds of the tape at one or both spools. U.S. Pat. No. 4,126,817, Luzio, operates the supply spool of a document positioning web of a reproducing machine as a derivative of the operation of the take-up spool to maintain a relatively constant tension on the web as it is accelerated or decelerated.

In magnetic tape drives, it has been recognized that, if the rotational velocity of tape reels are unchanged, the relative velocities of the tape at each reel varies as the tape is wound onto one reel and unwound from the other reel. Coassigned U.S. Pat. No. 4,015,799, Koski et al., adjusts the tape reel drive motor drive currents to adjust the rotational velocities of the reels to drive the tape at a constant velocity while maintaining tension on the tape by a "sum of torques" model. Koski et al. analyze reel and tape speed tachometers to determine the torques required for each drive motor to keep the tape under tension and in motion at the constant velocity. Coassigned U.S. Pat. No. 4,125,881, Eige et al, describes the calculations in greater detail, and employs a tape tension measurement for fine adjustments, and U.S. Pat. No. 5,576,905, Garcia et al., is a bi-directional version. U.S. Pat. No. 4,531,166, Anderson, provides an adaptive algorithm which uses initialization to determine if parameters have changed over time.

As the web handling systems, such as magnetic tape drives, become smaller, it becomes desirable to have a more direct path between the supply and take-up spools. A more direct path is, however, more sensitive to high frequency tension variations which occur, for example, during a single revolution of a spool, in that a tension variation may alter the speed of the magnetic tape at a tape head in a magnetic tape drive. It is also desirable to provide longer lengths of magnetic tape on a reel of a cartridge, and thinner tape is a means for providing longer tape without changing the size of the reel or cartridge. Hence, the magnetic tape itself becomes more sensitive to such high frequency tension variations, and may tend to distort. Further, the magnetic tape may be more flexible and be subject to sideways motion as the result of such high frequency tension variations, with the result that the recording tracks of the magnetic tape may move laterally in excess of the capability of the read/write tape head to adjust.

For example, U.S. Pat. No. 5,909,335, Hardeng, provides a motor control system for providing a speed control for magnetic tape, but also provides "flutter rollers" to "absorb a high frequency speed variation, known as flutter". The IBM 3590 Magstar employs a small "pucker pocket" to absorb tension variation, including high frequency tension variation.

High frequency tension variation also comes from any or all of several sources. One example comprises a molded spool, such as a magnetic tape reel hub in a magnetic tape cartridge, in which the spool itself is round, but which is off-center with respect to a drive engagement means for the reel at which a drive mechanism of a tape drive is inserted. Another example comprises a single reel magnetic tape cartridge in which the magnetic tape is wound on a supply reel in the cartridge, and the lead end of the tape comprises a leader block or threader which is inserted into a slot on a take-up reel in the tape drive. The leader block is not necessarily the exact size of the slot on the take-up reel, and may be smaller or larger than the slot, such that the magnetic tape extends into the slot to provide an effectively smaller radius, or is extended above the hub to provide an effectively larger radius. In a further example, a web handling spool may be manufactured such that it is distorted from a perfectly round shape. In a still further example, a driving shaft for a web handling spool may be mounted off-center with respect to the spool, such that the spool forms an eccentric.

Tension buffers tend to be expensive and to consume valuable space. There is a desire, for example, to reduce the size of magnetic tape drives as much as possible while maintaining the largest possible length of magnetic tape in a cartridge, the large length of tape allowing storage of a greater amount of data on the magnetic tape. These two goals are best met with a short, direct tape path between the supply and take-up reels, as discussed above, with a read and/or write head positioned so as to be intermediate the supply and take-up reels along the tape path, and not allowing room for a tension buffer along the tape path. A further goal is the reduction of the cost of the tape drive, and installation of a small vacuum "pucker pocket" is an expensive proposition.

SUMMARY OF THE INVENTION

It is an object of the present invention to reduce high frequency tension variation in web handling systems, such as magnetic tape drives.

A web handling system, such as a magnetic tape drive, comprises, in one embodiment, respectively, a first spool, a first drive motor for rotating the first spool, and a first tachometer for indicating the rotary position of the first spool, the first tachometer having an index indication; and a second spool, a second drive motor for rotating the second spool, and a second tachometer. In a magnetic tape drive, one or both spools (or reels) may be part of a removable cartridge, and not part of a magnetic tape drive per se.

The web handling system respectively winds and unwinds a web with respect to the spools to transport the web between the spools under tension.

In a magnetic tape drive, at least one read and/or write head is positioned so as to be intermediate the first and the second spools along a tape path, for reading and/or writing data to a magnetic tape as it is transported along the tape path between the first and the second spools when being respectively wound and unwound with respect to the first and the second spools.

A control system is coupled to the first drive motor, the first tachometer, the second drive motor and the second tachometer, and operates the first and the second drive motors for respectively winding and unwinding a magnetic tape with respect to the spools to transport the magnetic tape between the spools under tension.

In one embodiment, the control system compensates for web tension variation caused by the first spool, employing the following method:

(A) determining, from the first tachometer, the rotational frequency of the first spool;

(B) determining, from the second tachometer, variation in rotational velocity at the second spool which occurs at the frequency of the step (A) determined rotational frequency of the first spool;

(C) determining, from the first tachometer index indication, the rotational position at the first spool corresponding to the step (B) determined variation in rotational velocity at the second spool;

(D) calculating a drive motor profile for operating the first drive motor which tends to cancel the step (B) determined variation in rotational velocity at the second spool; and (E) superimposing the step (D) drive motor profile on the first drive motor at the step (C) determined rotational position of the first spool.

Thus, the present invention compensates for eccentricity in the first spool by calculating and superimposing a drive profile on the drive motor for the first spool. The drive profile is determined based on the variation in rotational velocity at the second spool caused by eccentricity in the first spool, and is known to be caused by the first spool since the variation is at the rotational frequency of the first spool.

The step (B) variation in rotational velocity determination may comprise employing a discrete Fourier transform (DFT) at the frequency of the step (A) determined rotational frequency, for determining the amplitude and phase of the determined variation.

The step (B) variation in rotational velocity determination may further comprise employing a linear resonating filter at the frequency of the step (A) determined frequency, for determining the amplitude and phase of the determined variation.

The step (D) calculation of the drive motor profile may comprise calculation of the drive torque variation in accordance with a sum of torques model, in that the drive torque variation comprises variation in torque due to radius variation of the first spool in the sum of torques model.

In another embodiment, the drive motor profile is calculated in an initializing operation, upon the web having substantially different diameters at each of the spools, such that the spools are rotated at substantially different rotational frequencies.

In a further embodiment, compensation is provided for web tension variation caused by both spools. Specifically, the second tachometer also has an index indication. In the method, the control system:

(1A) determines, from the first tachometer, the rotational frequency of the first spool;

(1B) determines, from the second tachometer, variation in rotational velocity at the second spool which occurs at the frequency of the (1A) determined rotational frequency of the first spool;

(1C) determines, from the first tachometer index indication, the rotational position at the first spool corresponding to the (1B) determined variation in rotational velocity at the second spool;

(1D) calculates a first drive motor profile for operating the first drive motor which tends to cancel the (1B) determined variation in rotational velocity at the second spool;

(1E) superimposes the (1D) drive motor profile on the first drive motor at the (1C) determined rotational position of the first spool;

(2A) determines, from the second tachometer, the rotational frequency of the second spool;

(2B) determines, from the first tachometer, variation in rotational velocity at the first spool which occurs at the frequency of the (2A) determined rotational frequency of the second spool;

(2C) determines, from the second tachometer index indication, the rotational position at the second spool corresponding to the (2B) determined variation in rotational velocity at the first spool;

(2D) calculates a second drive motor profile for operating the second drive motor which tends to cancel the (2B) determined variation in rotational velocity at the first spool; and (2E) superimposes the (2D) drive motor profile on the second drive motor at the (2C) determined rotational position of the second spool.

For a fuller understanding of the present invention, reference should be made to the following detailed description taken in conjunction with the accompanying drawings.

BRIEF DESCRIPTION OF THE DRAWINGS

FIG. 3 is a representation of signal traces of rotational velocities of the spools of the web handling system of FIG. 1, which are employed to compensate for eccentricity in each of the two spools, and of the actual tension on the web; and FIG. 4 is a diagrammatic representation of the determined amplitudes of variations in spool rotational velocities, as a function of rotational frequency, as measured at each of the spools of the web handling system of FIG. 1, and of the magnitude of the actual tension on the web.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
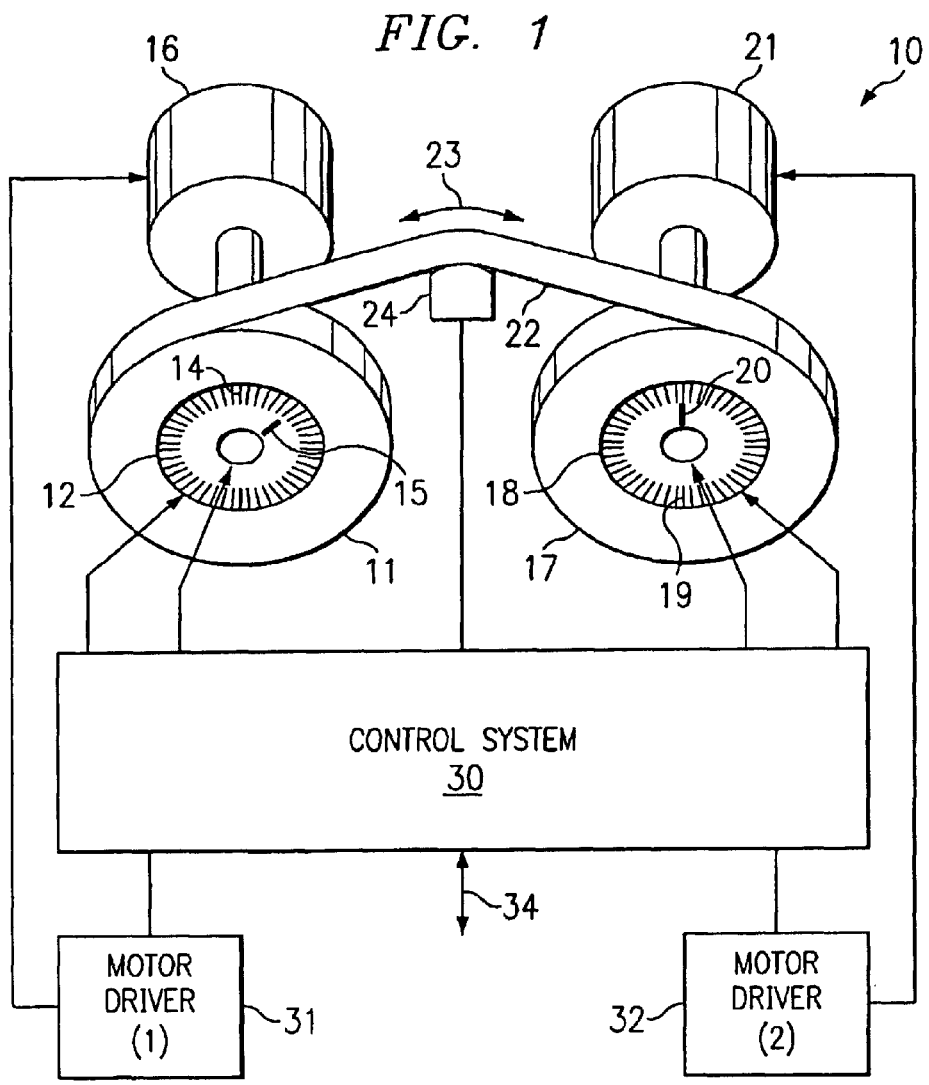
FIG. 1 is block diagram of an embodiment of a web handling system, such as a magnetic tape drive, employing the present invention to compensate for eccentricity in each of the two spools.

Referring to FIG. 1, a web handling system 10, such as a magnetic tape data storage system, is illustrated. One example of a magnetic tape data storage system in which the present invention may be employed is the IBM 3580 Ultrium magnetic tape subsystem based on LTO technology, and employs a relatively short and direct tape path. The direction of technology is towards even shorter and more direct tape paths, in order to minimize the size of the tape drive. A further goal is to minimize the cost of a tape drive, while maximizing its capability. As discussed above, short tape paths between the supply and take-up reels having a read and/or write head positioned so as to be intermediate the reels, do not allow room for a tension buffer along the tape path, and installation of a small vacuum "pucker pocket" is an expensive proposition.

The same is true of other web handling systems, such as document positioning systems, discussed above.

In the embodiment of FIG. 1, the web handling system 10, comprises a bi-directional system with a pair of spools or reels 11, 17, each driven by a respective drive motor 16, 21. One of the reels 11, 17 may comprise a reel of a removable single reel tape cartridge, or both reels may comprise reels of a removable dual reel tape cartridge. One of the spools or reels is termed a supply or outboard reel, such as the reel of a single reel cartridge, and the other spool or reel is termed a take-up or inboard reel. In the case of a magnetic tape, a tape head 24 is employed to read and/or write data on the magnetic tape.

As discussed above, coassigned U.S. Pat. No. 4,015,799, Koski et al. adjusts the tape reel drive motor drive currents to adjust the rotational velocities of the reels to maintain a constant tape velocity and to maintain a constant tension on the tape as the tape is wound onto one reel and unwound from the other reel. Koski et al. analyze reel and tape speed tachometers to determine the torques required for each drive motor, and employs a "sum of torques" model to keep the tape under tension and in motion at the constant velocity. Coassigned U.S. Pat. No. 4,125,881, Eige et al, describes the calculations in greater detail, and employs a tape tension measurement for fine adjustments, and U.S. Pat. No. 5,576, 905, Garcia et al., is a bi-directional version. U.S. Pat. No. 4,531,166, Anderson, provides an adaptive algorithm which uses initialization to determine if parameters have changed over time.

The Garcia et al. patent shows the use of a tachometer, such as a fine line tachometer 12, 18, mounted to a drive shaft of each of the motors 16 and 21. In the illustrated examples of FIG. 1, each of the tachometers has an outer circular array of fine tachometer lines 14, 19, and an index line 15, 20 displaced radially inward on a respective coding wheel from the fine line array. As an alternatives, the lines may be optically detected, or may comprise magnetic marks that are magnetically detected. A magnetic tape 22 is wound on the spools or reels 11, 17 and the motors 16, 21 are controlled by a control system 30 and motor drivers 31, 32 to move the magnetic tape for reading and/or writing in either of the two directions indicated by the arrow 23. As is understood by those of skill in the art, the control system 30 may comprise one or more control processors and associated devices for responding to one or more inputs 34, moving the tape 22, servoing both the speed of the tape and the lateral position of the tape head 24 with respect to the tape 22, and reading and/or writing data on the tape by means of the tape head 24.

Each of the tachometers 12, 18 functions as tape motion sensor, and each emits a single pulse in response to an index mark to signify completion of a large preselected angle, such as once per revolution of the reel 11, 17. The fine line tachometer arrays on the tachometers 12, 18 may be similar and emits a large number of pulses during each revolution of the respective reel 11, 17. As one example, the fine line tachometer arrays may each comprise 512 or 1024 marks for a revolution.

As is known by those of skill in the art, and as discussed by the above patents, the motors are operated to maintain tension on the web, such as a magnetic tape, employing a "sum of torques" model, which is built upon by the present invention. Using the sum of torques model, the torque required at a given spool is calculated as:

$$T_{(SPOOL)} = T_{(TENSION)} + T_{(VISCOUS\ DRAG)} + T_{(COULOMB)} + T_{(ACCELERATION)},$$

where the torque is related to the motor current by the radius of the web wound on the spool. The acceleration torque is also related to the radius of the web wound on the spool (inertia), and comprises either acceleration or deceleration. The tension is additive on the spool on which the web is being wound and is subtractive on the spool from which the web is being unwound. As an example, tape tension may comprise 4 oz. in a given tape drive, and may be significantly higher on a web of a document positioning web handling system. As also known to those skilled in the art, the typical model adjusts the motor torque on a low frequency basis, adding the thickness of one wrap for each revolution of the spool on which the web is wound, and subtracting the thickness of one wrap for each revolution of the spool from which the web is unwound.

As further discussed above, higher precision is required for thin webs, such as a thin magnetic tape. As an example, an eccentricity resulting in a runout in the amount of 0.1% can result in a tension variation of 25%.

The eccentricity resulting in variations in tension come from any or all of several sources. In the case of a single reel cartridge, the magnetic tape is wound on a supply reel in the cartridge, and the lead end of the tape comprises a leader block or threader which is inserted into a slot on the take-up reel in the tape drive. As discussed above, the leader block is not necessarily the exact size of the slot on the take-up reel, and may be smaller or larger than the slot such that the magnetic tape extends into the slot to provide an effectively smaller radius, or is extended above the hub to provide an effectively larger radius.

In the case of the supply reel of a single reel cartridge, or either reel of a dual reel cartridge, the spool may be non-round, or the spool itself is round, but is off-center with respect to a drive engagement means for the reel at which a drive mechanism from the respective drive motor is inserted.

In the case of a web handling system without cartridges, such as a document positioning system, the web handling spool may be manufactured such that it is distorted from a perfectly round shape. In a further example, a driving shaft for a web handling spool may be mounted off-center with respect to the spool, such that the spool forms an eccentric.

The present invention compensates for eccentricity in the first spool by calculating and superimposing a drive profile on the drive motor for the first spool. The drive profile is determined based on the variation in rotational velocity at the second spool caused by eccentricity in the first spool, and is known to be caused by the first spool since the variation is at the rotational frequency of the first spool. In the same fashion, the present invention compensates for eccentricity in the second spool by calculating and superimposing a drive profile on the drive motor for the second spool. The drive profile is determined based on the variation in rotational velocity at the first spool caused by eccentricity in the second spool, and is known to be caused by the second spool since the variation is at the rotational frequency of the second spool.

Figure 2:
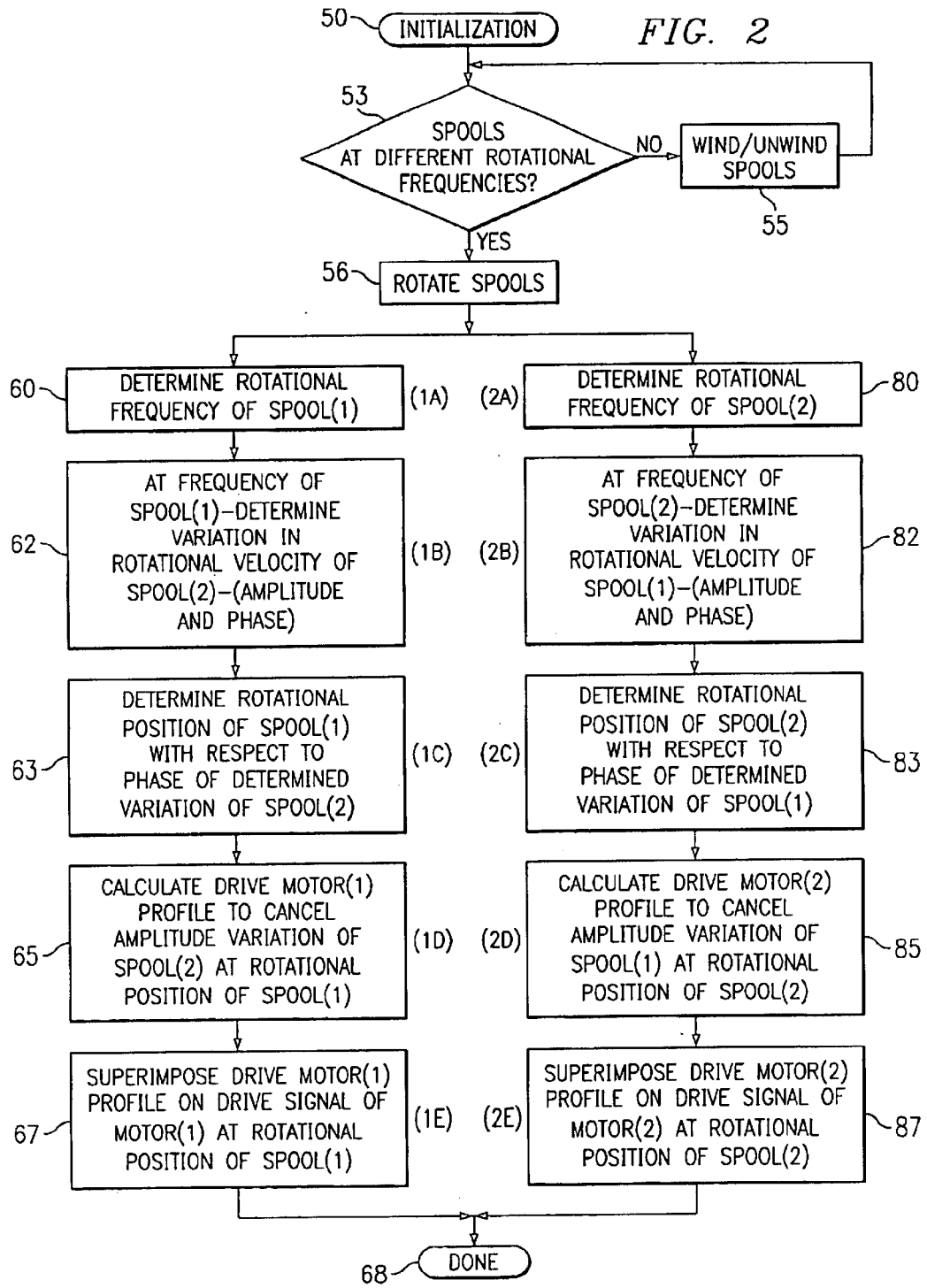
FIG. 2 is a flow chart depicting an embodiment of the method of the present invention for compensating for eccentricity in each of the two spools of the web handling system of FIG. 1.

Referring additionally to FIG. 2, the method of the present invention is preferably conducted during an initialization procedure 50, for example, when a removable cartridge is first loaded in a tape drive.

In step 53, the control system 30 of FIG. 1 determines whether the spools are rotating at different rotational frequencies, which is required for discriminating between the spools. As an example, the differential between the rotational velocities of the two spools should be greater than 5%. In the case of a single reel cartridge, nearly all of the tape is wound on the cartridge spool when the cartridge is loaded, and should therefore have a larger radius, and therefore a slower rotational velocity, than the take-up spool of the tape drive. In the case of a dual reel cartridge, equal amounts of tape may be wound on each spool, and the rotational velocities are equal. In this case, the control system, in step 55, unwinds the tape from one spool and winds it on the other until step 53 indicates that the desired differential has been reached.

Once the desired differential in rotational velocities has been reached, in step 56, the spools are rotated employing the above typical algorithms. In one embodiment, the initialization may be conducted simultaneously for both spool (1) and for spool (2), and, in another embodiment, they may be conducted separately. If one of the spools is a precision spool, the initialization of the present invention may alternatively conducted only for the other spool. Hence, in FIG. 2, the first of the above embodiments is illustrated for the purpose of completeness with two tracks, one for each spool, and the other embodiments may be visualized by changing the arrangement to a sequence, or by eliminating one of the process tracks.

Herein, the tracks of the process will be discussed sequentially, while the process may be conducted in any of the above embodiments.

The track of the process that relates to the initialization for spool (1), which may for example comprise spool 11 of FIG. 1, begins at step 60, in which (1A) the rotational frequency of the first spool, spool (1), is determined by employing the fine line tachometer array 14 on the tachometer 12. In accordance with the present invention, variation in rotational velocity of the second spool (2) which occurs at a frequency which is that of the rotational frequency of the first spool is attributed to eccentricities of the first spool. In other words, a variation that occurs once every revolution of the first spool is necessarily at the rotational frequency of the first spool.

In one example, in step 60, the marks of the fine line array 14 are counted for a specific period of time to determine the rotational frequency of the first spool 11, knowing the number of marks in a revolution.

Step 62 isolates the frequency of the rotational frequency of the first spool 11, and determines the (1B) variation in rotational velocity at that frequency at the second spool 17, comprising both the amplitude and phase of the variation.

In one embodiment, the step 62 (1B) variation in rotational velocity determination comprises employing a discrete Fourier transform (DFT) at the frequency of the step (1A) determined rotational frequency, for determining amplitude and phase of the determined variation.

In a more specific embodiment, a linear resonating filter is tuned to the step 60 (1A) determined frequency. In FIG. 3, signal trace 70 represents the rotational velocity of the supply spool 11 of FIG. 1, called for example, the outboard spool; signal trace 71 represents the rotational velocity of the take-up spool 17 of FIG. 1, called for example, the inboard spool, and signal trace 72 represents the actual tension on the web.

An efficient method of isolating the variations in rotational velocity is to employ digital signal processing, and to employ a Goertzel linear resonating digital filter tuned to the determined frequency. The Goertzel filters are known to those of skill in the art and are described, for example, in "Introduction to Digital Signal Processing", Proakis and Manolakis, Macmillan Publishing Company, 1998, pp. 724–726.

In the present invention, in step 62, the signals 71 for the second spool 17 are detected as digital samples and the filter is run at an integer of the period of the determined frequency of spool 11, all as implemented by the control system 30 of FIG. 1. Resultant discrete Fourier transforms of the spools provide both the variation in rotational velocity at the second spool 17 which occurs at the frequency of the step 60 (1A) determined rotational frequency of the first spool 11, and the phase of that variation with respect to the index mark 20 of the tachometer 18 of the second spool.

FIG. 4 represents several determined amplitudes of variations in spool rotational velocities, as a function of rotational frequency, as measured at each of the spools of the web handling system of FIG. 1, and of the magnitude of the actual tension on the web. Specifically, trace 74 connects determined amplitudes of variations of rotational velocity of the supply or outboard spool 11 of FIG. 1; trace 75 connects determined amplitudes of variations of rotational velocity of the take-up or inboard spool 17 of FIG. 1; and trace 76 represents the magnitude of the actual tension on the web. As shown, the take-up or inboard spool 17 is rotating at the higher frequency at this point of tape motion.

In step 62, the Goertzel linear resonating digital filter is tuned to the determined frequency 77 of FIG. 4, which is the rotational frequency of the outboard first spool 11. The resultant discrete Fourier transform of the variation in rotational velocity at the second spool 17 which occurs at the frequency 77 of the step 60 (1A) is represented by point 78 in FIG. 4. In FIG. 4, the illustration shows that the motor velocity variation is of a higher magnitude at the first spool 11 than at the second spool 17, which spool is relied on for the present invention. In fact, this is an illustration of a variation that is unreliable with respect to the tension at the tape head 24 in FIG. 1. Rather, in accordance with the present invention, the magnitude of tension changes that result in motor velocity variations at the second spool 17 is the reliable measure of the state of the tape at the tape head 24, which is employed by the present invention.

Step 63 (1C) determines the rotational position at the first spool 11 which corresponds to the step 62 (1B) determined phase of the variation in rotational velocity at the second spool 17, employing the first tachometer index indication. In one embodiment, in step 63, the relative phases of the index marks 20 (of the second spool 17) and 15 (of the first spool 11) are compared and then compared to the phase of the variation in rotational velocity of step 62. Thus, the phase of the variation in rotational velocity is translated to be provided with respect to the index mark 15 of the tachometer 12 of the first spool.

In step 65 (1D), the control system 30 of FIG. 1 calculates a drive motor profile for operating the first drive motor 16 which tends to cancel the step (1B) determined variation in rotational velocity at the second spool 17. In one embodiment, the step (1D) calculation of the drive motor profile comprises calculation of the drive torque variation in accordance with a sum of torques model. In an example of a sum of torques model, the torque required at a given spool is calculated as:

$$T_{(SPOOL)} = T_{(TENSION)} + T_{(VISCOUS\ DRAG)} + T_{(COULOMB)} + T_{(ACCELERATION)} + T_{(RADIUS\ VARIATION)};$$

where the torque is related to the motor current by the radius of the web wound on the spool, and the drive torque variation comprises variation in torque due to radius variation of the first spool 11 in the sum of torques model.

In step 67 (1E), the control system 30 of FIG. 1 operates the motor driver 31, superimposing the step 65 (1D) drive motor profile on the normal operation of the first drive motor 16. The drive motor profile is superimposed to affect operation of the drive motor 16 at the phase or rotational position of the first spool 11 as determined in step 63 (1C). The drive motor profile is superimposed for operations of the drive motor 16 in either direction of rotation, as depicted by arrow 23 in FIG. 1. As is known to those of skill in the art, and as discussed above, certain of the torques are added or are subtracted, depending on whether the magnetic tape is being wound onto, or unwound from, the spool 11.

Step 68 indicates that the initialization process is complete.

Thus, the present invention compensates for eccentricity in the first spool 11 by calculating and superimposing a drive profile on the drive motor 16 for the first spool. The drive profile is determined based on the variation in rotational velocity at the second spool 17 caused by eccentricity in the first spool 11, and is known to be caused by the first spool since the variation is at the rotational frequency of the first spool.

In the other track, represented by steps 80–87, the steps are identical to steps 60–67, but the spools are reversed in each step.

The track of the process that relates to the initialization for the second spool (2), which for example comprises spool 17 of FIG. 1, begins at step 80, in which (2A) the rotational frequency of the second spool 17 is determined by employing the fine line tachometer array 19 on the tachometer 18. In accordance with the present invention, variation in rotational velocity of the first spool 11 which occurs at a frequency which is that of the rotational frequency of the second spool is attributed to eccentricities of the second spool. In other words, a variation that occurs once every revolution of the second spool is necessarily at the rotational frequency of the second spool.

Thus, for example, in step 80, the marks of the fine line array 19 are counted for a specific period of time to determine the rotational frequency of the second spool 17, knowing the number of marks in a revolution.

Step 82 isolates the frequency of the rotational frequency of the second spool 17, and determines the (2B) variation in rotational velocity at that frequency at the first spool 11, comprising both the amplitude and phase of the variation.

As discussed above, in one embodiment, the step 82 (2B) variation in rotational velocity determination comprises employing a discrete Fourier transform (DFT) at the frequency of the step (2A) determined rotational frequency, for determining amplitude and phase of the determined variation.

In a more specific embodiment, a linear resonating filter is tuned to the step 80 (2A) determined frequency, employing digital signal processing and a Goertzel linear resonating digital filter tuned to the determined frequency.

In the present invention, in step 82, the signals 70 of FIG. 3 for the first or outboard spool 11 are detected as digital samples and the filter is run at an integer of the period of the determined frequency of spool 17. Resultant discrete Fourier transforms of the spools provide both the variation in rotational velocity at the first spool 11 which occurs at the frequency of the step 80 (2A) determined rotational frequency of the second spool 17, and the phase of that variation in rotational velocity with respect to the index mark 15 of the tachometer 12 of the first spool.

As discussed above, FIG. 4 represents the determined amplitudes of variations in spool rotational velocities, as a function of rotational frequency, as measured at each of the spools of the web handling system of FIG. 1, and of the magnitude of the actual tension on the web, trace 74 connecting determined amplitudes of variations of rotational velocity of the supply or outboard spool 11 of FIG. 1; trace 75 connecting determined amplitudes of variations of rotational velocity of the take-up or inboard spool 17 of FIG. 1.

In step 82, the Goertzel linear resonating digital filter is tuned to the determined frequency 97 of FIG. 4, which is the rotational frequency of inboard second spool 17. The resultant discrete Fourier transform of the variation in rotational velocity at the first spool 11 which occurs at the frequency 97 of step 80 (2A) is represented by point 98 in FIG. 4. As pointed out above, in FIG. 4, the illustration shows that the motor velocity variation is of a higher magnitude at the second spool 17 than at the first spool 11, but the variation at the second spool 17 is unreliable with respect to the tension at the tape head 24 in FIG. 1. Rather, in accordance with the present invention, the magnitude of tension changes that result in motor velocity variations at the first spool 11 is the reliable measure of the state of the tape at the tape head 24, which the present invention corrects.

Step 83 (2C) determines the rotational position at the second spool 17 which corresponds to the step 82 (2B) determined phase of the variation in rotational velocity at the first spool 11, employing the second tachometer index indication. In one embodiment, in step 83, the relative phases of the index marks 15 (of the first spool 11) and 20 (of the second spool 17) are compared and then compared to the phase of the variation in rotational velocity of step 82. Thus, the phase of the variation in rotational velocity is translated to be provided with respect to the index mark 20 of the tachometer 18 of the second spool.

In step 85 (2D), the control system 30 of FIG. 1 calculates a drive motor profile for operating the second drive motor 21 which tends to cancel the step (2B) determined variation in rotational velocity at the first spool 11. As discussed above, in one embodiment, the step (2D) calculation of the drive motor profile comprises calculation of the drive torque variation in accordance with the same sum of torques model as above:

$$T_{(SPOOL)} = T_{(TENSION)} + T_{(VISCOUS\ DRAG)} + T_{(COULOMB)} + T_{(ACCELERATION)} + T_{(RADIUS\ VARIATION)};$$

where the torque is related to the motor current by the radius of the web wound on the spool, and the drive torque variation comprises variation in torque due to radius variation of the second spool 17 in the sum of torques model.

In step 87 (2E), the control system 30 of FIG. 1 operates the motor driver 32, superimposing the step 85 (2D) drive motor profile on the normal operation of the second drive motor 21. The drive motor profile is superimposed to affect operation of the drive motor 21 at the phase or rotational position of the second spool 17 as determined in step 83 (2C). The drive motor profile is superimposed for operations of the drive motor 21 in either direction of rotation, as depicted by arrow 23 in FIG. 1. As discussed above, certain of the torques are added or are subtracted, depending on whether the magnetic tape is being wound onto, or unwound from, the spool 17.

Step 68 indicates that the initialization process is complete.

Thus, the present invention compensates for eccentricity in the second spool 17 by calculating and superimposing a drive profile on the drive motor 21 for the first spool. The drive profile is determined based on the variation in rotational velocity at the first spool 11 caused by eccentricity in the second spool 17, and is known to be caused by the second spool since the variation is at the rotational frequency of the second spool.

Those of skill in the art understand that alternative models than the sum of torques models may be employed, and operate the drive motors 16 and 21, and that alternative techniques than the Goertzel filter may be employed to obtain the amplitudes and phases of the rotational velocity variations.

While the preferred embodiments of the present invention have been illustrated in detail, it should be apparent that modifications and adaptations to those embodiments may occur to one skilled in the art without departing from the scope of the present invention as set forth in the following claims.

We claim:

1. In a web handling system comprising, respectively, a first spool, a first drive motor for rotating said first spool, and a first tachometer for indicating the rotary position of said first spool, said first tachometer having an index indication; and a second spool, a second drive motor for rotating said second spool, and a second tachometer; said web handling system for respectively winding and unwinding a web with respect to said spools to transport said web between said spools under tension; a method for compensating for web tension variation caused by said first spool, comprising the steps of:

(A) determining, from said first tachometer, the rotational frequency of said first spool;

(B) determining, from said second tachometer, variation in rotational velocity at said second spool which occurs at the frequency of said step (A) determined rotational frequency of said first spool;

(C) determining, from said first tachometer index indication, the rotational position at said first spool corresponding to said step (B) determined variation in rotational velocity at said second spool;

(D) calculating a drive motor profile for operating said first drive motor which tends to cancel said step (B) determined variation in rotational velocity at said second spool; and (E) superimposing said step (D) drive motor profile on said first drive motor at said step (C) determined rotational position of said first spool.

2. The method of claim 1, wherein said second tachometer additionally comprises an index indication; wherein said step (B) variation in rotational velocity determination comprises employing a discrete Fourier transform (DFT) at said frequency of said step (A) determined rotational frequency, for determining amplitude and phase of said determined variation, said phase determined from said second tachometer index indication; and wherein said step (C) rotational position at said first spool is determined by comparing the phase of said first tachometer index indication to that of said second tachometer index indication.

3. The method of claim 2, wherein said step (B) variation in rotational velocity determination additionally comprises employing a linear resonating filter at said frequency of said step (A) determined frequency, for determining said amplitude and phase of said determined variation.

4. The method of claim 1, wherein said step (D) calculation of said drive motor profile comprises calculating drive current variation to provide drive torque variation to cancel radius variation.

5. The method of claim 4, wherein said step (D) calculation of said drive motor profile comprises calculation of said drive torque variation in accordance with a sum of torques model, and wherein said drive torque variation comprises variation in torque due to radius variation of said first spool in said sum of torques model.

6. In a web handling system comprising, respectively, a first spool, a first drive motor for rotating said first spool, and a first tachometer for indicating the rotary position of said first spool, said first tachometer having an index indication; and a second spool, a second drive motor for rotating said second spool, and a second tachometer; said web handling system for respectively winding and unwinding a web with respect to said spools to transport said web between said spools under tension; a method for compensating for web tension variation caused by said first spool, comprising the steps of:

(0) initializing operation of said drive motors for rotating said spools upon said web having substantially different diameters at each of said spools, such that said spools are rotated at substantially different rotational frequencies;

(A) determining, from said first tachometer, the rotational frequency of said first spool;

(B) determining, from said second tachometer, variation in rotational velocity at said second spool which occurs at the frequency of said step (A) determined rotational frequency of said first spool;

(C) determining, from said first tachometer index indication, the rotational position at said first spool corresponding to said step (B) determined variation in rotational velocity at said second spool;

(D) calculating a drive motor profile for operating said first drive motor which tends to cancel said step (B) determined variation in rotational velocity at said second spool; and (E) superimposing said step (D) drive motor profile on said first drive motor at said step (C) determined rotational position of said first spool.

7. In a web handling system comprising, respectively, a first spool, a first drive motor for rotating said first spool, and a first tachometer for indicating the rotary position of said first spool, said first tachometer having an index indication; and a second spool, a second drive motor for rotating said second spool, and a second tachometer, said second tachometer having an index indication; said web handling system for respectively winding and unwinding a web with respect to said spools to transport said web between said spools under tension; a method for compensating for web tension variation caused by said spools, comprising the steps of:

(1A) determining, from said first tachometer, the rotational frequency of said first spool;

(1B) determining, from said second tachometer, variation in rotational velocity at said second spool which occurs at the frequency of said step (1A) determined rotational frequency of said first spool;

(1C) determining, from said first tachometer index indication, the rotational position at said first spool corresponding to said step (1B) determined variation in rotational velocity at said second spool;

(1D) calculating a first drive motor profile for operating said first drive motor which tends to cancel said step (1B) determined variation in rotational velocity at said second spool;

(1E) superimposing said step (1D) drive motor profile on said first drive motor at said step (1C) determined rotational position of said first spool;

(2A) determining, from said second tachometer, the rotational frequency of said second spool;

(2B) determining, from said first tachometer, variation in rotational velocity at said first spool which occurs at the frequency of said step (2A) determined rotational frequency of said second spool;

(2C) determining, from said second tachometer index indication, the rotational position at said second spool corresponding to said step (2B) determined variation in rotational velocity at said first spool;

(2D) calculating a second drive motor profile for operating said second drive motor which tends to cancel said step (2B) determined variation in rotational velocity at said first spool; and (2E) superimposing said step (2D) drive motor profile on said second drive motor at said step (2C) determined rotational position of said second spool.

8. The method of claim 7, respectively wherein said step (1B) second spool variation in rotational velocity determination, and wherein said step (2B) first spool variation in rotational velocity determination, comprise employing a discrete Fourier transform (DFT) at said frequency of said step (1A) determined rotational frequency, and at said frequency of said step (2A) determined rotational frequency, for respectively determining amplitude and phase of said respective determined variation; said phase determined from, in step (1B), said second tachometer index indication, and, in step (2B), said first tachometer index indication.

9. The method of claim 8, respectively wherein said step (1B) variation in rotational velocity determination, and said step (2B) variation in rotational velocity determination, additionally comprise respectively employing a linear resonating filter at said frequency of said step (1A) determined frequency, and employing a linear resonating filter at said frequency of said step (2A) determined frequency, for determining said amplitude and phase of said respective determined variation.

10. The method of claim 7, respectively wherein said step (1D) calculation of said first drive motor profile, and said step (2D) calculation of said second drive motor profile, each comprises calculating drive current variation to provide drive torque variation to cancel radius variation.

11. The method of claim 10, respectively wherein said step (1D) calculation of said first drive motor profile, and said step (2D) calculation of said second drive motor profile, each comprises calculation of said drive torque variation in accordance with a sum of torques model, and wherein said drive torque variation comprises variation in torque due to radius variation of said first spool in said sum of torques model.

12. In a web handling system comprising, respectively, a first spool, a first drive motor for rotating said first spool, and a first tachometer for indicating the rotary position of said first spool, said first tachometer having an index indication; and a second spool, a second drive motor for rotating said second spool, and a second tachometer, said second tachometer having an index indication; said web handling system for respectively winding and unwinding a web with respect to said spools to transport said web between said spools under tension; a method for compensating for web tension variation caused by said spools, comprising the steps of:

(0) initializing operation of said drive motors for rotating said spools upon said web having substantially different diameters at each of said spools, such that said spools are rotated at substantially different rotational frequencies;

(1A) determining, from said first tachometer, the rotational frequency of said first spool;

(1B) determining, from said second tachometer, variation in rotational velocity at said second spool which occurs at the frequency of said step (1A) determined rotational frequency of said first spool;

(1C) determining, from said first tachometer index indication, the rotational position at said first spool corresponding to said step (1B) determined variation in rotational velocity at said second spool;

(1D) calculating a first drive motor profile for operating said first drive motor which tends to cancel said step (1B) determined variation in rotational velocity at said second spool;

(1E) superimposing said step (1D) drive motor profile on said first drive motor at said step (1C) determined rotational position of said first spool;

(2A) determining, from said second tachometer, the rotational frequency of said second spool;

(2B) determining, from said first tachometer, variation in rotational velocity at said first spool which occurs at the frequency of said step (2A) determined rotational frequency of said second spool;

(2C) determining, from said second tachometer index indication, the rotational position at said second spool corresponding to said step (2B) determined variation in rotational velocity at said first spool;

(2D) calculating a second drive motor profile for operating said second drive motor which tends to cancel said step (2B) determined variation in rotational velocity at said first spool; and (2E) superimposing said step (2D) drive motor profile on said second drive motor at said step (2C) determined rotational position of said second spool.

13. A web handling system comprising:

a first spool;

a first drive motor for rotating said first spool;

a first tachometer for indicating the rotary position of said first spool, said first tachometer having an index indication;

a second spool;

a second drive motor for rotating said second spool;

a second tachometer; and a control system coupled to said first drive motor, said first tachometer, said second drive motor and said second tachometer, said control system operating said first and said second drive motors for respectively winding and unwinding a web with respect to said spools to transport said web between said spools under tension; said control system compensating for web tension variation caused by said first spool, said control system:

(A) determines, from said first tachometer, the rotational frequency of said first spool;
(B) determines, from said second tachometer, variation in rotational velocity at said second spool which occurs at the frequency of said (A) determined rotational frequency of said first spool;
(C) determines, from said first tachometer index indication, the rotational position at said first spool corresponding to said (B) determined variation in rotational velocity at the frequency of said second spool;
(D) calculates a drive motor profile for operating said first drive motor which tends to cancel said (B) determined variation in rotational velocity at said second spool; and
(E) superimposes said (D) drive motor profile on said first drive motor at said (C) determined rotational position of said first spool.

14. The web handling system of claim 13, wherein said second tachometer additionally comprises an index indication; wherein said control system (B) variation in rotational velocity determination comprises employing a discrete Fourier transform (DFT) at said frequency of said (A) determined rotational frequency, for determining amplitude and phase of said determined variation, said phase determined from said second tachometer index indication; and wherein said control system (C) rotational position determination at said first spool comprises comparing the phase of said first tachometer index indication to that of said second tachometer index indication.

15. The web handling system of claim 14, wherein said control system (B) variation in rotational velocity determination additionally comprises employing a linear resonating filter at said frequency of said (A) determined frequency, for determining said amplitude and phase of said determined variation.

16. The web handling system of claim 13, wherein said control system (D) calculation of said drive motor profile comprises calculating drive current variation to provide drive torque variation to cancel radius variation.

17. The web handling system of claim 16, wherein said control system (D) calculation of said drive motor profile comprises calculation of said drive torque variation in accordance with a sum of torques model, and wherein said drive torque variation comprises variation in torque due to radius variation of said first spool in said sum of torques model.

18. A web handling system comprising:
a first spool;
a first drive motor for rotating said first spool;
a first tachometer for indicating the rotary position of said first spool, said first tachometer having an index indication;
a second spool;
a second drive motor for rotating said second spool;
a second tachometer; and
a control system coupled to said first drive motor, said first tachometer, said second drive motor and said second tachometer, said control system operating said first and said second drive motors for respectively winding and unwinding a web with respect to said spools to transport said web between said spools under tension; said control system compensating for web tension variation caused by said first spool, said control system:
(0) initializes operation of said drive motors to rotate said spools upon said web having substantially different diameters at each of said spools, such that said spools are rotated at substantially different rotational frequencies;

(A) determines, from said first tachometer, the rotational frequency of said first spool;
(B) determines, from said second tachometer, variation in rotational velocity at said second spool which occurs at the frequency of said (A) determined rotational frequency of said first spool;
(C) determines, from said first tachometer index indication, the rotational position at said first spool corresponding to said (B) determined variation in rotational velocity at said second spool;
(D) calculates a drive motor profile for operating said first drive motor which tends to cancel said (B) determined variation in rotational velocity at said second spool; and
(E) superimposes said (D) drive motor profile on said first drive motor at said (C) determined rotational position of said first spool.

19. A web handling system comprising:
a first spool;
a first drive motor for rotating said first spool;
a first tachometer for indicating the rotary position of said first spool, said first tachometer having an index indication;
a second spool;
a second drive motor for rotating said second spool;
a second tachometer, said second tachometer having an index indication; and
a control system coupled to said first drive motor, said first tachometer, said second drive motor and said second tachometer; said control system operating said first and said second drive motors for respectively winding and unwinding a web with respect to said spools to transport said web between said spools under tension; said control system compensating for web tension variation caused by said spools, said control system:
(1A) determines, from said first tachometer, the rotational frequency of said first spool;
(1B) determines, from said second tachometer, variation in rotational velocity at said second spool which occurs at the frequency of said (1A) determined rotational frequency of said first spool;
(1C) determines, from said first tachometer index indication, the rotational position at said first spool corresponding to said (1B) determined variation in rotational velocity at said second spool;
(1D) calculates a first drive motor profile for operating said first drive motor which tends to cancel said (1B) determined variation in rotational velocity at said second spool;
(1E) superimposes said (1D) drive motor profile on said first drive motor at said (1C) determined rotational position of said first spool;
(2A) determines, from said second tachometer, the rotational frequency of said second spool;
(2B) determines, from said first tachometer, variation in rotational velocity at said first spool which occurs at the frequency of said (2A) determined rotational frequency of said second spool;
(2C) determines, from said second tachometer index indication, the rotational position at said second spool corresponding to said (2B) determined variation in rotational velocity at said first spool;
(2D) calculates a second drive motor profile for operating said second drive motor which tends to cancel said (2B) determined variation in rotational velocity at said first spool; and (2E) superimposes said (2D) drive motor profile on said second drive motor at said (2C) determined rotational position of said second spool.

20. The web handling system of claim 19, wherein said control system respective said (1B) second spool variation in rotational velocity determination, and respective said (2B) first spool variation in rotational velocity determination, comprise employing a discrete Fourier transform (DFT) at said frequency of said (1A) determined rotational frequency, and at said frequency of said (2A) determined rotational frequency, for respectively determining amplitude and phase of said respective determined variation; said phase determined from, in (1B), said second tachometer index indication, and, in (2B), said first tachometer index indication.

21. The web handling system of claim 20, wherein said control system respective said (1B) variation in rotational velocity determination, and respective said (2B) variation in rotational velocity determination, additionally comprise respectively employing a linear resonating filter at said frequency of said (1A) determined frequency, and employing a linear resonating filter at said frequency of said (2A) determined frequency, for determining said amplitude and phase of said respective determined variation.

22. The web handling system of claim 19, wherein said control system respective said (1D) calculation of said first drive motor profile, and said (2D) calculation of said second drive motor profile, each comprises calculating drive current variation to provide drive torque variation to cancel radius variation.

23. The web handling system of claim 22, wherein said control system respective said (1D) calculation of said first drive motor profile, and said (2D) calculation of said second drive motor profile, each comprises calculation of said drive torque variation in accordance with a sum of torques model, and wherein said drive torque variation comprises variation in torque due to radius variation of said first spool in said sum of torques model.

24. A web handling system comprising:
   a first spool;
   a first drive motor for rotating said first spool;
   a first tachometer for indicating the rotary position of said first spool, said first tachometer having an index indication;
   a second spool;
   a second drive motor for rotating said second spool;
   a second tachometer, said second tachometer having an index indication; and
   a control system coupled to said first drive motor, said first tachometer, said second drive motor and said second tachometer; said control system operating said first and said second drive motors for respectively winding and unwinding a web with respect to said spools to transport said web between said spools under tension; said control system compensating for web tension variation caused by said spools, said control system:
   (0) initializes operation of said drive motors to rotate said spools upon said web having substantially different diameters at each of said spools, such that said spools are rotated at substantially different rotational frequencies;
   (1A) determines, from said first tachometer, the rotational frequency of said first spool;
   (1B) determines, from said second tachometer, variation in rotational velocity at said second spool which occurs at the frequency of said (1A) determined rotational frequency of said first spool;
   (1C) determines, from said first tachometer index indication, the rotational position at said first spool corresponding to said (1B) determined variation in rotational velocity at said second spool;
   (1D) calculates a first drive motor profile for operating said first drive motor which tends to cancel said (1B) determined variation in rotational velocity at said second spool;
   (1E) superimposes said (1D) drive motor profile on said first drive motor at said (1C) determined rotational position of said first spool;
   (2A) determines, from said second tachometer, the rotational frequency of said second spool;
   (2B) determines, from said first tachometer, variation in rotational velocity at said first spool which occurs at the frequency of said (2A) determined rotational frequency of said second spool;
   (2C) determines, from said second tachometer index indication, the rotational position at said second spool corresponding to said (2B) determined variation in rotational velocity at said first spool;
   (2D) calculates a second drive motor profile for operating said second drive motor which tends to cancel said (2B) determined variation in rotational velocity at said first spool; and
   (2E) superimposes said (2D) drive motor profile on said second drive motor at said (2C) determined rotational position of said second spool.

25. A magnetic tape drive for reading and/or writing data on a magnetic tape, comprising:
   a first drive motor for rotating a first spool for winding and unwinding a magnetic tape;
   a first tachometer for indicating the rotary position of said first spool, said first tachometer having an index indication;
   a second drive motor for rotating a second spool for winding and unwinding a magnetic tape;
   a second tachometer;
   at least one read and/or write head positioned so as to be intermediate said first and said second spools along a tape path, for reading and/or writing data to a magnetic tape as it is transported along said tape path between said first and said second spools when being respectively wound and unwound with respect to said first and said second spools; and
   a control system coupled to said first drive motor, said first tachometer, said second drive motor and said second tachometer; said control system operating said first and said second drive motors for respectively winding and unwinding a magnetic tape with respect to said spools to transport said magnetic tape between said spools under tension; said control system compensating for magnetic tape tension variation caused by said first spool, said control system:
   (A) determines, from said first tachometer, the rotational frequency of said first spool;
   (B) determines, from said second tachometer, variation in rotational velocity at said second spool which occurs at the frequency of said (A) determined rotational frequency of said first spool;
   (C) determines, from said first tachometer index indication, the rotational position at said first spool corresponding to said (B) determined variation in rotational velocity at said second spool;

(D) calculates a drive motor profile for operating said first drive motor which tends to cancel said (B) determined variation in rotational velocity at said second spool; and (E) superimposes said (D) drive motor profile on said first drive motor at said (C) determined rotational position of said first spool.

26. The magnetic tape drive of claim 25, wherein said second tachometer additionally comprises an index indication; wherein said control system (B) variation in rotational velocity determination comprises employing a discrete Fourier transform (DFT) at said frequency of said (A) determined rotational frequency, for determining amplitude and phase of said determined variation, said phase determined from said second tachometer index indication; and wherein said control system (C) rotational position determination at said first spool comprises comparing the phase of said first tachometer index indication to that of said second tachometer index indication.

27. The magnetic tape drive of claim 26, wherein said control system (B) variation in rotational velocity determination additionally comprises employing a linear resonating filter at said frequency of said (A) determined frequency, for determining said amplitude and phase of said determined variation.

28. The magnetic tape drive of claim 25, wherein said control system (D) calculation of said drive motor profile comprises calculating drive current variation to provide drive torque variation to cancel radius variation.

29. The magnetic tape drive of claim 28, wherein said control system (D) calculation of said drive motor profile comprises calculation of said drive torque variation in accordance with a sum of torques model, and wherein said drive torque variation comprises variation in torque due to radius variation of said first spool in said sum of torques model.

30. A magnetic tape drive for reading and/or writing data on a magnetic tape, comprising:

a first drive motor for rotating a first spool for winding and unwinding a magnetic tape;

a first tachometer for indicating the rotary position of said first spool, said first tachometer having an index indication;

a second drive motor for rotating a second spool for winding and unwinding a magnetic tape;

a second tachometer;

at least one read and/or write head positioned so as to be intermediate said first and said second spools along a tape path, for reading and/or writing data to a magnetic tape as it is transported along said tape path between said first and said second spools when being respectively wound and unwound with respect to said first and said second spools; and a control system coupled to said first drive motor, said first tachometer, said second drive motor and said second tachometer, said control system operating said first and said second drive motors for respectively winding and unwinding a magnetic tape with respect to said spools to transport said magnetic tape between said spools under tension; said control system compensating for magnetic tape tension variation caused by said first spool, said control system:

(0) initializes operation of said drive motors to rotate said spools upon said magnetic tape having substantially different diameters at each of said spools, such that said spools are rotated at substantially different rotational frequencies;

(A) determines, from said first tachometer, the rotational frequency of said first spool;

(B) determines, from said second tachometer, variation in rotational velocity at said second spool which occurs at the frequency of said (A) determined rotational frequency of said first spool;

(C) determines, from said first tachometer index indication, the rotational position at said first spool corresponding to said (B) determined variation in rotational velocity at said second spool;

(D) calculates a drive motor profile for operating said first drive motor which tends to cancel said (B) determined variation in rotational velocity at said second spool; and (E) superimposes said (D) drive motor profile on said first drive motor at said (C) determined rotational position of said first spool.

31. A magnetic tape drive for reading and/or writing data on a magnetic tape, comprising:

a first drive motor for rotating a first spool for winding and unwinding a magnetic tape;

a first tachometer for indicating the rotary position of said first spool, said first tachometer having an index indication;

a second drive motor for rotating a second spool for winding and unwinding a magnetic tape;

a second tachometer, said second tachometer having an index indication;

at least one read and/or write head positioned so as to be intermediate said first and said second spools along a tape path, for reading and/or writing data to a magnetic tape as it is transported along said tape path between said first and said second spools when being respectively wound and unwound with respect to said first and said second spools; and a control system coupled to said first drive motor, said first tachometer, said second drive motor and said second tachometer; said control system operating said first and said second drive motors for respectively winding and unwinding a magnetic tape with respect to said spools to transport said magnetic tape between said spools under tension; said control system compensating for magnetic tape tension variation caused by said spools, said control system:

(1A) determines, from said first tachometer, the rotational frequency of said first spool;

(1B) determines, from said second tachometer, variation in rotational velocity at said second spool which occurs at the frequency of said (1A) determined rotational frequency of said first spool;

(1C) determines, from said first tachometer index indication, the rotational position at said first spool corresponding to said (1B) determined variation in rotational velocity at said second spool;

(1D) calculates a first drive motor profile for operating said first drive motor which tends to cancel said (1B) determined variation in rotational velocity at said second spool;

(1E) superimposes said (1D) drive motor profile on said first drive motor at said (1C) determined rotational position of said first spool;

(2A) determines, from said second tachometer, the rotational frequency of said second spool;

(2B) determines, from said first tachometer, variation in rotational velocity at said first spool which occurs at the frequency of said (2A) determined rotational frequency of said second spool;

(2C) determines, from said second tachometer index indication, the rotational position at said second spool corresponding to said (2B) determined variation in rotational velocity at said first spool;

(2D) calculates a second drive motor profile for operating said second drive motor which tends to cancel said (2B) determined variation in rotational velocity at said first spool; and (2E) superimposes said (2D) drive motor profile on said second drive motor at said (2C) determined rotational position of said second spool.

32. The magnetic tape drive of claim 31, wherein said control system respective said (1B) second spool variation in rotational velocity determination, and respective said (2B) first spool variation in rotational velocity determination, comprise employing a discrete Fourier transform (DFT) at said frequency of said (1A) determined rotational frequency, and at said frequency of said (2A) determined rotational frequency, for respectively determining amplitude and phase of said respective determined variation; said phase determined from, in (1B), said second tachometer index indication, and, in (2B), said first tachometer index indication.

33. The magnetic tape drive of claim 32, wherein said control system respective said (1B) variation in rotational velocity determination, and respective said (2B) variation in rotational velocity determination, additionally comprise respectively employing a linear resonating filter at said frequency of said (1A) determined frequency, and employing a linear resonating filter at said frequency of said (2A) determined frequency, for determining said amplitude and phase of said respective determined variation.

34. The magnetic tape drive of claim 31, wherein said control system respective said (1D) calculation of said first drive motor profile, and said (2D) calculation of said second drive motor profile, each comprises calculating drive current variation to provide drive torque variation to cancel radius variation.

35. The magnetic tape drive of claim 34, wherein said control system respective said (1D) calculation of said first drive motor profile, and said (2D) calculation of said second drive motor profile, each comprises calculation of said drive torque variation in accordance with a sum of torques model, and wherein said drive torque variation comprises variation in torque due to radius variation of said first spool in said sum of torques model.

36. A magnetic tape drive for reading and/or writing data on a magnetic tape, comprising:

a first drive motor for rotating a first spool for winding and unwinding a magnetic tape;

a first tachometer for indicating the rotary position of said first spool, said first tachometer having an index indication;

a second drive motor for rotating a second spool for winding and unwinding a magnetic tape;

a second tachometer, said second tachometer having an index indication;

at least one read and/or write head positioned so as to be intermediate said first and said second spools along a tape path, for reading and/or writing data to a magnetic tape as it is transported along said tape path between said first and said second spools when being respectively wound and unwound with respect to said first and said second spools; and a control system coupled to said first drive motor, said first tachometer, said second drive motor and said second tachometer; said control system operating said first and said second drive motors for respectively winding and unwinding a magnetic tape with respect to said spools to transport said magnetic tape between said spools under tension; said control system compensating for magnetic tape tension variation caused by said spools, said control system:

(0) initializes operation of said drive motors to rotate said spools upon said magnetic tape having substantially different diameters at each of said spools, such that said spools are rotated at substantially different rotational frequencies;

(1A) determines, from said first tachometer, the rotational frequency of said first spool;

(1B) determines, from said second tachometer, variation in rotational velocity at said second spool which occurs at the frequency of said (1A) determined rotational frequency of said first spool;

(1C) determines, from said first tachometer index indication, the rotational position at said first spool corresponding to said (1B) determined variation in rotational velocity at said second spool;

(1D) calculates a first drive motor profile for operating said first drive motor which tends to cancel said (1B) determined variation in rotational velocity at said second spool;

(1E) superimposes said (1D) drive motor profile on said first drive motor at said (1C) determined rotational position of said first spool;

(2A) determines, from said second tachometer, the rotational frequency of said second spool;

(2B) determines, from said first tachometer, variation in rotational velocity at said first spool which occurs at the frequency of said (2A) determined rotational frequency of said second spool;

(2C) determines, from said second tachometer index indication, the rotational position at said second spool corresponding to said (2B) determined variation in rotational velocity at said first spool;

(2D) calculates a second drive motor profile for operating said second drive motor which tends to cancel said (2B) determined variation in rotational velocity at said first spool; and (2E) superimposes said (2D) drive motor profile on said second drive motor at said (2C) determined rotational position of said second spool.

* * * * *